United States Patent
Wussow

(10) Patent No.: US 6,209,698 B1
(45) Date of Patent: Apr. 3, 2001

(54) SPEED CONTROL WRAP SPRING CLUTCH

(75) Inventor: James Wussow, El Paso, TX (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/544,996

(22) Filed: Apr. 6, 2000

Related U.S. Application Data

(62) Division of application No. 09/023,525, filed on Feb. 13, 1998, now Pat. No. 6,138,808.

(51) Int. Cl.[7] .............................. F16D 19/00; F16D 27/00; F16D 37/02
(52) U.S. Cl. ..................... 192/84.81; 180/170; 123/399
(58) Field of Search .................... 192/84.1, 84.2, 192/84.6, 84.8, 84.81, 84.93; 180/170

(56) References Cited

U.S. PATENT DOCUMENTS

| | | | |
|---|---|---|---|
| 1,843,987 | 2/1932 | Ragan | 74/801 |
| 2,408,993 | 10/1946 | Nardone . | |
| 2,497,659 | 2/1950 | Davis et al. | 166/18 |
| 3,315,773 | 4/1967 | Aschauer . | |
| 3,892,144 | 7/1975 | Kirkegaard | 74/805 |
| 3,966,024 | 6/1976 | Baer | 188/71.2 |
| 4,263,995 | 4/1981 | Wahlstedt | 192/35 |
| 4,321,992 | 3/1982 | Gallo | 192/81 C |
| 4,460,076 | * 7/1984 | Yamada | 192/35 |
| 4,756,287 | 7/1988 | Sakakibara et al. | 123/342 |
| 4,809,656 | 3/1989 | Suzuki | 123/361 |
| 4,907,553 | 3/1990 | Porter | 123/400 |
| 4,913,274 | 4/1990 | Nishimura | 192/84 T |
| 4,932,375 | 6/1990 | Burney | 123/361 |
| 4,938,327 | 7/1990 | Tominaga . | |
| 5,016,589 | 5/1991 | Terazawa | 123/399 |
| 5,022,369 | 6/1991 | Terazawa | 123/399 |
| 5,040,508 | 8/1991 | Watanabe | 123/396 |
| 5,056,613 | 10/1991 | Porter et al. | 180/178 |
| 5,092,296 | 3/1992 | Gunter et al. | 123/337 |
| 5,099,974 | 3/1992 | Spechko | 192/415 |
| 5,127,502 | 7/1992 | Billings | 192/35 |
| 5,133,437 | 7/1992 | Larson | 192/12 BA |
| 5,251,735 | 10/1993 | Lamoureux | 192/84 T |
| 5,301,646 | * 4/1994 | Doi et al. | 123/399 |
| 5,345,157 | 9/1994 | Suzuki et al. | 318/280 |
| 5,433,181 | 7/1995 | Suzuki | 123/399 |
| 5,595,089 | 1/1997 | Watanabe et al. | 74/89.15 |
| 5,687,822 | 11/1997 | Arai | 192/84.81 |
| 5,967,274 | * 10/1999 | Leone et al. | 192/35 |
| 6,135,227 | * 10/2000 | Laning | 180/170 |

* cited by examiner

*Primary Examiner*—Rodney H. Bonck
*Assistant Examiner*—Tisha D. Lewis
(74) *Attorney, Agent, or Firm*—Dykema Gossett PLLC

(57) ABSTRACT

A speed control device having a high-efficiency, electromagnetically actuated wrap spring clutch that is capable of generating a high torque output using a low power input is provided. Both a control collar and a coil housing of the clutch have annular flanges portions that are axially adjacent and extend in directions perpendicular to the longitudinal axis of the shaft. The geometry of the two flanges portions results in a high level of magnetic flux transfer between the housing and the control collar when a current is generated in the coil by application of an input power. The high level of magnetic flux transfer draws the control collar and the shaft hub into a tight frictional engagement even with a low power input to the clutch. As a result, the clutch is able to generate a high torque output despite a low power input. The inventive clutch is used in a vehicle speed control device.

20 Claims, 3 Drawing Sheets

SPEED CONTROL WRAP SPRING CLUTCH

This application is a divisional application of U.S. application Ser. No. 09/023,525, filed Feb. 13, 1998 and now U.S. Pat. No. 6,138,808.

BACKGROUND OF THE INVENTION

1. Field of the Invention

This invention relates to a wrap spring clutch and more particularly to an electromagnetically actuated wrap spring clutch that is capable of generating a high torque output using a low power input.

2. Disclosure of Related Art

A conventional, electromagnetically actuated, wrap spring clutch includes an output shaft, a shaft hub disposed about the shaft and connected for rotation therewith, and an input hub. The input hub is also disposed about the shaft, but may rotate independently of the shaft when the wrap spring clutch is deenergized. The clutch further includes a coil substantially disposed about the shaft hub and an annular wrap spring disposed about a portion of the input hub and a portion of the shaft hub. A first end of the wrap spring is connected to the input hub so that the spring rotates with the input hub. Energizing the coil establishes magnetic flux circuits or closed loops in the magnetically permeable portions of the clutch. Attractive forces arising from the flux draw a second end of the spring into contact with the shaft hub (which may be non-rotating at this point). Frictional forces restrain the second end of the spring from rotating. The difference in relative rotation between the first and second ends of the spring causes the spring to wrap down upon the shaft hub, thereby transmitting torque from the input hub to the shaft hub and output shaft.

Conventional clutches have long suffered from poor efficiency. The geometry of the magnetically permeable portions of a conventional clutch generally does not permit generation of a sufficient level of magnetic flux in response to relatively low power inputs. A decreased magnetic flux provides less attractive forces internal to the clutch (i.e., between the input and output components of the clutch) which, in turn, results in a diminished torque capacity. The inability to transmit a sufficient level of torque to the output shaft in response to low power inputs renders conventional clutches unsuitable for certain applications, such as automotive applications, where available power is limited as an initial matter, and in which large variations in voltage must be provided for (e.g., as a result of a reduction in the voltage output of a chemical battery during extremely cold weather).

There is thus a need for a wrap spring clutch that minimizes or eliminates one or more of the above-mentioned problems.

SUMMARY OF THE INVENTION

The present invention provides a relatively high efficiency electromagnetically actuated wrap spring clutch. An object of the present invention is to provide a clutch that is capable of generating a high torque output using a low power input to the clutch coil.

An electromagnetically actuated wrap spring clutch in accordance with the present invention includes a shaft assembly, a control assembly and a coil assembly. The shaft assembly includes a shaft extending along a longitudinal axis and a shaft hub disposed radially outwardly of the shaft and mounted to the shaft for rotation therewith. The control assembly includes an input hub that is disposed radially outwardly of the shaft and that is rotatable relative to the shaft. The control assembly also includes an annular control collar having a collar flange portion and a wrap spring that is connected at one end to the control collar and at a second end to the input hub. The input hub, spring, and control collar rotate as a unit about the shaft. The coil assembly includes a housing disposed radially outwardly of the shaft hub and a coil within the housing. The housing has a housing flange portion that is axially adjacent the collar flange portion of the control collar.

In a preferred embodiment, both the collar flange portion and the housing flange portion are perpendicular to the longitudinal axis extending through the shaft. The collar flange portion extends away from the axis while the housing flange portion extends towards the axis. The geometry of the housing flange portion and the collar flange portion insures that a relatively large portion of the surface area of the housing is adjacent a relatively large portion of the control collar. This geometry promotes a high level of magnetic flux transfer between the housing and the control collar—two of the magnetically permeable components in a magnetic flux circuit created when a current is generated in the coil. Moreover, the geometry promotes a high level of magnetic flux transfer between the control collar and the shaft hub. Therefore, even with a low power input, there is a strong attraction between the input components of the clutch, including the control collar—and the input hub it is connected to—and the output components of the clutch, including the shaft hub. A clutch in accordance with the present invention is therefore able to transmit a high level of torque from the input hub to the shaft hub using a low power input.

An advantage of the present invention is that it can be used in applications, such as automotive applications, where available power is limited as an initial matter, and in which large variations in power must be provided for (e.g., as a result of a reduction in the voltage output of a chemical battery during extremely cold weather).

In a preferred application, the inventive clutch may be utilized in a speed control device of a vehicle. Conventional speed control devices employ means, such as a tooth clutch, for selectively transmitting torque from a motor driven input shaft to an output shaft in order to selectively actuate a throttle control. Because return springs bias the throttle control to a predetermined position, the torque transmitted to the output shaft must be sufficient to overcome the biasing force of the return springs. As a result, conventional speed control devices have employed large and/or expensive torque transmitting means to transmit a high level of torque from the input shaft to the output shaft. The present invention, however, is able to transmit a high level of torque despite its relatively small size and weight—thereby representing a significant improvement in the art. In addition, the present invention is able to transmit a high level of torque despite using significantly less electrical power than conventional torque transmitting means.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
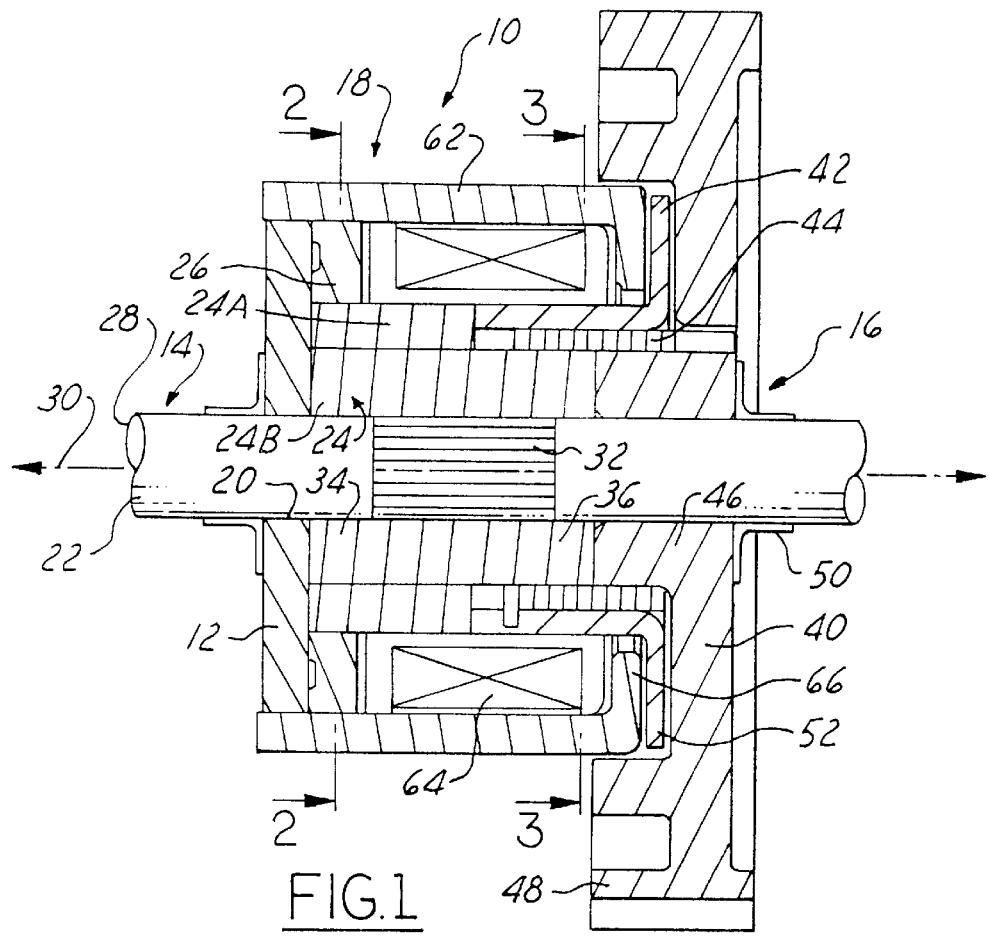
FIG. 1 is a sectional view of an electromagnetically actuated wrap spring clutch in accordance with the present invention.

Referring now to the drawings wherein like reference numerals are used to identify identical components in the various views, FIG. 1 shows a sectional view of an electromagnetically actuated wrap spring clutch 10 in accordance with the present invention. Clutch 10 includes an end plate 12, an output shaft assembly 14, a control assembly 16, and a coil assembly 18.

End plate 12 is provided to maintain the physical location and relationship of the component parts of clutch 10. End plate 12 may be annular and has an aperture 20. End plate 12 may be made from a powdered metal such as bronze.

Output shaft assembly 14 is provided to selectively rotate an object affixed to shaft assembly 14. Shaft assembly 14 includes a shaft 22 and a shaft hub 24. Shaft assembly 14 may also include a flux transfer hub 26.

Shaft 22 is provided as a means for mounting an object for selective rotation with shaft 22. The object may be mounted at end 28 of shaft 22. Shaft 22 is preferably made of a non-ferromagnetic material, but may be composed of other materials. Shaft 22 extends through aperture 20 of end plate 12 and is centered about, and extends longitudinally along, a longitudinal axis 30. Shaft 22 may include a knurled portion 32 extending longitudinally along axis 30 for mounting shaft hub 24 to shaft 22.

Figure 2:
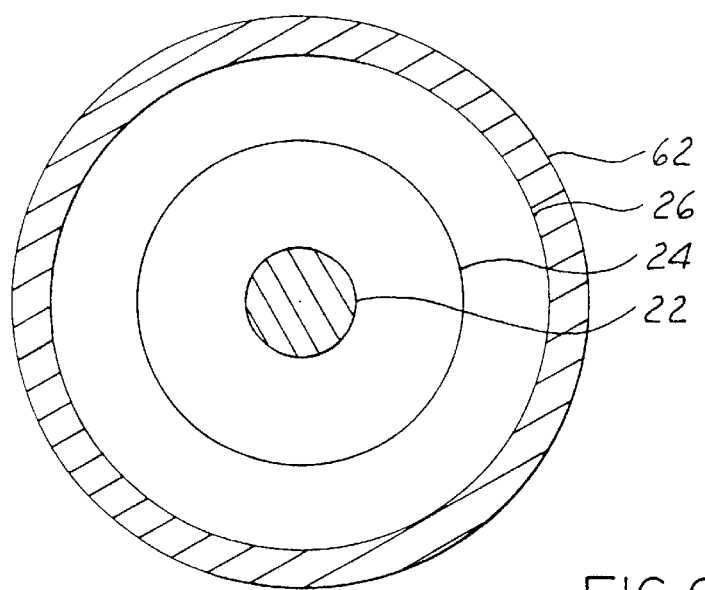
FIGS. 2 and 3 are sectional views of the clutch of FIG. 1 viewed in the direction of lines 2—2 and 3—3, respectively.

Shaft hub 24 is provided as a means for selective engagement of output assembly 14 with control assembly 16. Hub 24 is preferably made from a material having a relatively high magnetic permeability, such as powdered iron or another ferromagnetic material. Alternatively, in another preferred construction, a first part 24A of hub 24 may be made of a magnetic material while a second part 24B is made of a non-magnetic material so as to better channel magnetic flux from control collar 42 to hub 24 as described in greater detail hereinbelow. As shown in FIG. 2, hub 24 is annular and disposed radially outwardly of axis 30 and shaft 22. Referring again to FIG. 1, hub 24 includes a first portion 34 having a first diameter and a second portion 36 having a second diameter that is less than the first diameter. First and second portions 34, 36, define a shoulder 38 therebetween (best shown in FIG. 4). As illustrated, hub 24 is unitary in construction. However, hub 24 could be divided into a plurality of sections press fit together. Hub 24 is mounted to shaft 22 for rotation therewith by sliding hub 24 onto knurled portion 32 of shaft 22.

Flux transfer hub 26 is provided as part of a magnetic flux circuit for the transfer of magnetic flux from shaft hub 24 to coil assembly 18 as discussed more fully hereinbelow. Hub 26 may be made of a ferromagnetic material such as powdered iron and is press fit onto shaft hub 24 between shaft hub 24 and coil assembly 18. Although shaft hub 24 and flux transfer hub 26 are shown as separate components of clutch 10, it should be understood that they could be combined into a single hub. As illustrated in FIG. 2, flux transfer hub 26 is annular and is centered about axis 30. Hub 26 may be disposed radially outwardly of shaft hub 24 and radially inwardly of coil assembly 18.

Control assembly 16 is provided to selectively transmit a torque to output shaft assembly 14. Control assembly 16 may include an input hub 40, a control collar 42, and a wrap spring 44.

Input hub 40 is preferably composed of a non-ferromagnetic material such as glass filled nylon and may be disposed radially outwardly of shaft 22. Hub 40 is rotatable relative to shaft 22 and axis 30. A portion 46 of hub 40 may be axially adjacent portion 36 of shaft hub 24 and may have the same diameter as portion 36. It should be understood, however, that the diameters of shaft hub 24 and input hub 40, and their respective portions 34, 36, and 46, may vary depending upon a particular application. The outer periphery of input hub 40 may comprise a gear 48. Input hub 40 may be integral with gear 48 as shown in FIG. 1 or may comprise a separate component mounted within gear 48 for rotation with gear 48. Input hub 40 may be held in place adjacent shaft hub 24 by an annular sleeve 50 disposed about shaft 22.

Figure 3:
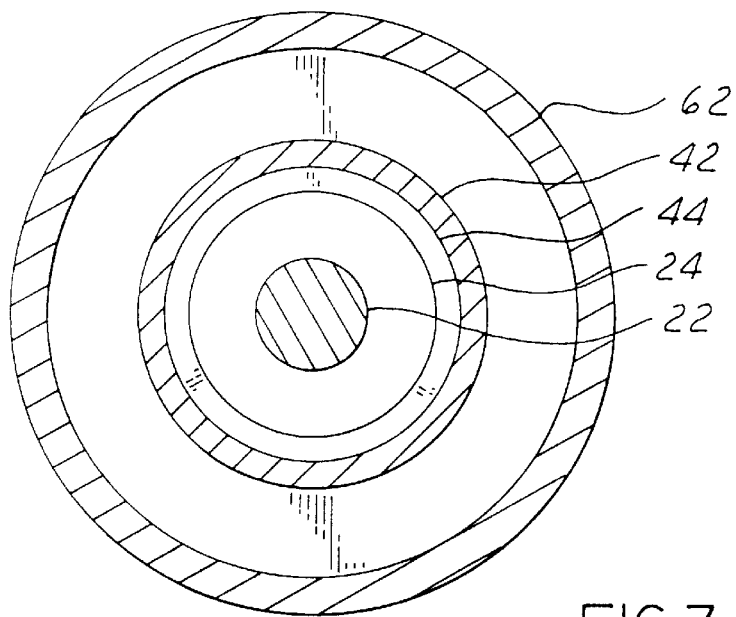

Control collar 42 is provided to selectively, frictionally engage shaft hub 24 of shaft assembly 14. Collar 42 may be made from a ferromagnetic material such as powdered iron. As illustrated in FIG. 3, collar 42 is annular and is centered about axis 30. Collar 42 is disposed radially outwardly of shaft 22. Referring again to FIG. 1, collar 42 is generally L-shaped in cross-section, having an annular collar flange portion 52 extending away from, and in a direction perpendicular to, axis 30. Collar 42 also includes a friction surface 43 (best shown in FIG. 4). Collar 42 is coupled to one end of spring 44, the other end of which is connected to input hub 40. Like input hub 40, collar 42 is rotatable relative to shaft 22 and axis 30. Collar 42 may be disposed radially outwardly of a portion of input hub 40, such as portion 46, and a portion of shaft hub 24, such as portion 36. Collar 42 may also be disposed radially outwardly of spring 44.

Figure 4:
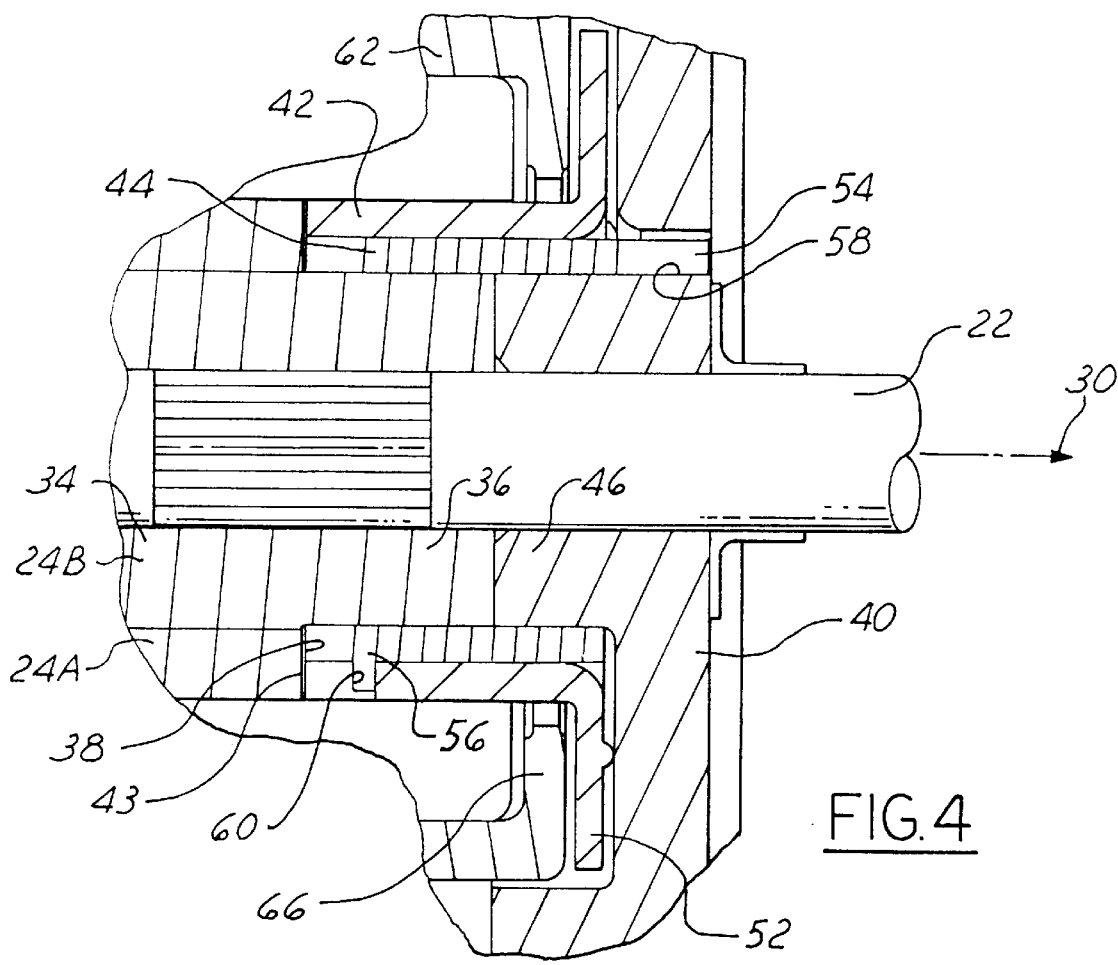
FIG. 4 is an enlarged view of one portion of the sectional view shown in FIG. 1.

Wrap spring 44 is provided to securely engage input hub 40 and shaft hub 24 upon the frictional engagement of collar 42 and shaft hub 24 as described hereinbelow. Spring 44 is conventional in the art and may be made from known materials such as music wire. As best shown in FIG. 4, spring 44 is connected at one end to input hub 40 and at a second end to collar 42 by a first tang 54 and a second tang 56, respectively, that may be inserted within corresponding notches 58, 60, cut within input hub 40 and control collar 42. Spring 44 may be disposed radially outwardly of a portion of input hub 40, such as portion 46 and portion of shaft hub 24, such as portion 36.

Coil assembly 18 is provided to generate a magnetic field to cause control assembly 16 to selectively engage shaft assembly 14, and, consequently, to cause the selective rotation of shaft 22 and an object affixed to shaft 22. Coil assembly 18 includes an annular housing 62 and a coil 64 disposed within housing 62.

Housing 62 is provided to house coil 64 and to form part of a magnetic circuit for the transfer of magnetic flux within clutch 10. Housing 62 may be made of a ferromagnetic material, such as powdered iron. As shown in FIG. 2, housing 62 is annular and is centered about axis 30. Housing 62 is disposed radially outwardly of shaft hub 24. Referring again to FIG. 1, housing 62 is substantially L-shaped in cross-section and includes an annular housing flange portion 66 that extends towards, and in a direction perpendicular to, axis 30. Housing flange portion 66 is axially adjacent collar flange portion 52.

Coil 64 is provided to generate a magnetic field, and create a magnetic flux circuit among the magnetically permeable components of clutch 10, when current is supplied to coil 64. Coil 64 is conventional in the art and can be made from known materials such as copper. Coil 64 is disposed within housing 62 and current is supplied to coil 64 through housing 62 by a power source (not shown).

A power input, or control signal, to clutch 10 causes current to flow within coil 64. Generation of the current in coil 64 produces a magnetic field and creates a magnetic flux circuit comprised of housing 62, collar 42, shaft hub 24, and flux transfer hub 26. The magnetic circuit provides a path for the transfer of magnetic flux resulting from the magnetic field. The particular geometry of collar flange portion 52 and housing flange portion 66 insures a high level of magnetic flux transfer between housing 62 and collar 42 because large portions of the surface of housing 62 and collar 42 are adjacent. As collar flange portion 52 is drawn closer to housing flange portion 66 due to the magnetic attraction between the two, friction surface 43 of control collar 42 is brought into engagement with shoulder 38 of shaft hub 24. Frictional forces then restrain collar 42 and the end of spring 44 that is connected to collar 42 from rotating. The other end of spring 44 continues to rotate with input hub 40. The difference in relative rotation between the ends of spring 44 causes spring 44 to wrap down upon shaft hub 24 thereby connecting input hub 40 of control assembly 16 to shaft hub 24 of shaft assembly 14. In this manner, torque is selectively generated in shaft assembly 14.

The axial alignment of large portions of the surfaces of housing 62 and control collar 42 results in a high level of flux transfer and, therefore, a strong magnetic attraction, between housing 62 and control collar 42. The strong magnetic attraction between housing 62 and collar 42 results in a tight frictional engagement between friction surface 43 of control collar 42 and shoulder 38 of shaft hub 24—even during a low power input to clutch 10. In this manner, a clutch in accordance with the present invention is able to generate higher torque outputs than conventional clutches receiving the same input power. This ability makes the inventive clutch particularly suitable for applications, such as automotive applications, where the available power is limited as an initial matter, and in which wide variations in power must be provided for (e.g., as a result of a reduction in the voltage output of a chemical battery during extremely cold weather).

Figure 5:
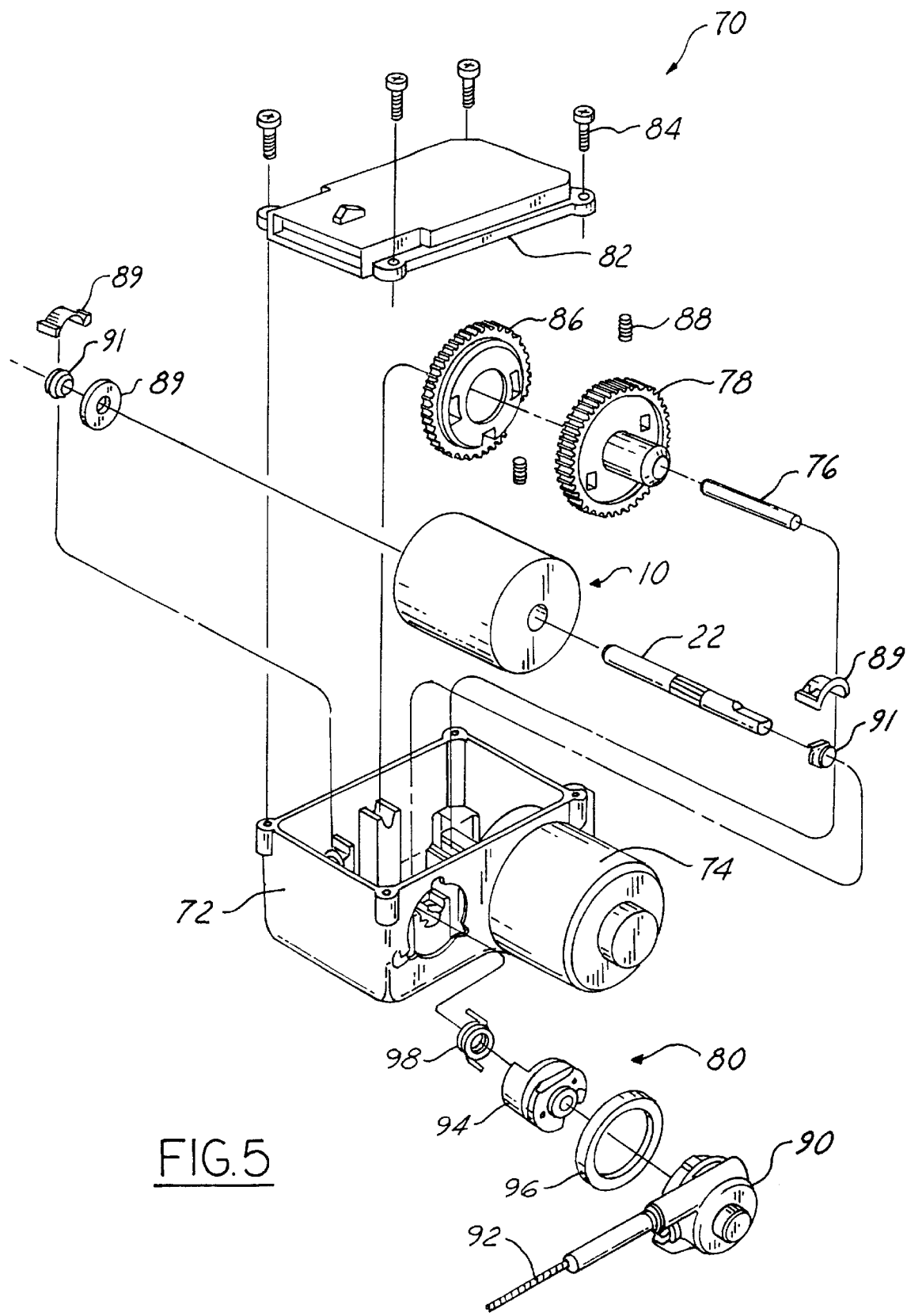
FIG. 5 is an exploded, perspective view of a speed control device incorporating an electromagnetically actuated wrap spring clutch in accordance with the present invention.

Referring now to FIG. 5, a vehicle speed control device 70 is illustrated incorporating an electromagnetic spring clutch, such as clutch 10. Besides clutch 10, device 70 includes a housing 72, means, such as motor 74, for rotating an input shaft 76, a transfer gear 78, and means, such as cable assembly 80, for controlling a throttle assembly (not shown) of the vehicle.

Housing 72 is provided to protect the internal components of device 70 from external elements. Housing 72 may be made from a plurality of conventional materials including various metals and plastics. Housing 72 includes a module 82 through which electrical connections may be made to clutch 10 and motor 74 and control signals provided to clutch 10 and motor 74. Module 82 may be secured to the rest of housing 72 by screws 84, bolts, or other fastening means.

Motor 74 is provided to cause input shaft 76 to rotate. Motor 74 is conventional in the art and may take on any of a plurality of forms well-known in the art. Input shaft 76 extends from motor 74 and is also conventional in the art.

Transfer gear 78 is provided to impart rotation to input hub 40 of clutch 10 responsive to rotation of input shaft 76. As mentioned hereinabove, the peripheral portion of input hub 40 may comprise a gear 48. The teeth of gear 78 mesh with the teeth of gear 48. Device 70 may also include an anti-backlash gear 86 connected to transfer gear 78 by anti-backlash springs 88. The teeth of gear 86 also mesh with the teeth of gear 48. Gear 86 and springs 88 function in a conventional manner to reduce mechanical noise and increase response time in response to a change in rotational direction of gear 48. Transfer gear 78, anti-backlash gear 86, and springs 88 are all conventional in the art.

Clutch 10 is utilized within device 70 to selectively couple input shaft 76 of device 70 with output shaft 22 extending from clutch 10. As described in greater detail hereinabove with reference to FIG. 1, wrap spring 44—which is connected to input hub 40—is selectively, electromagnetically actuated through a power input, or control signal, to wrap down upon shaft hub 24 of clutch 10. Because shaft hub 24 is connected to output shaft 22, the torque generated by input shaft 76 and transmitted to input hub 40 via transfer gear 78, is transmitted to output shaft 22. Clutch 10 may be positionally secured by a plurality of conventional retainers 89 and bearings 91. It should be understood that a speed control device in accordance with the present invention is not limited by the particular structure of the inventive electromagnetic wrap-spring clutch described herein as clutch 10. A speed control device in accordance with the present invention may alternatively include any of a plurality of conventional electromagnetic spring clutches.

Cable assembly 80 is provided to control the throttle assembly (not shown) of the vehicle according to a rotation of output shaft 22. Assembly 80 includes a plurality of conventional components including cover assembly 90, cable 92, spool 94, seal 96, and return spring 98. Cover assembly 90 is provided to house cable 92 and spool 94. Cable 92 is provided to actuate the throttle assembly and is wound upon spool 94 which is connected to output shaft 22. Seal 96 is provided to prevent the loss of lubricants from cover assembly 90 and the introduction of foreign objects into cover assembly 90. Finally, return spring 98 is provided to bias spool 94, and therefore, cable 92 and the throttle assembly, to a predetermined position.

The use of an electromagnetic spring clutch within speed control device 70 represents a significant improvement over conventional speed control devices. Because of the biasing force of return spring 98, a high level of torque must be transmitted from input shaft 76 to output shaft 22 in order to rotate shaft 22. Conventional speed control devices have relied on large and/or expensive torque transmitting means, such as a tooth clutch, to transmit the necessary amount of torque. An electromagnetic spring clutch, however, is much smaller and less expensive. Moreover, an electromagnetic spring clutch can produce a high torque output despite a low power input. Furthermore, the use of the inventive electromagnetic wrap-spring clutch described and illustrated herein (i.e. clutch 10) will result in an even higher torque output than conventional electromagnetic spring clutches using the same low power input.

The use of an electromagnetic spring clutch in speed control device 70—and, in particular, the use of an electromagnetic wrap-spring clutch in accordance with the present invention—has several advantages over conventional devices. First, because an electromagnetic wrap-spring clutch in accordance with the present invention utilizes only a few parts it can be assembled much easier than conventional torque transmitting means—and without machining. Second, the inventive clutch is more tolerant of vibrations and the harsh automotive environment. Third, there is less inertia associated with the moving parts of the inventive clutch. Fourth, an electromagnetic wrap-spring clutch in accordance with the present invention has an unlimited stroke length whereas, for example, a conventional tooth clutch is limited to 180 degrees of rotation. Finally, the inventive clutch produces less noise than conventional torque transmitting means.

While the invention has been particularly shown and described with reference to the preferred embodiments thereof, it is well understood by those skilled in the art that various changes and modifications can be made in the invention without departing from the spirit and scope of the invention.

What is claimed is:

1. A speed control device, comprising:
   means for rotating an input shaft;
   an electromagnetic spring clutch having an output shaft extending along a longitudinal axis, said clutch being configured to selectively couple said input shaft with said output shaft according to a control signal; and,
   means for controlling a throttle assembly of a vehicle according to a rotation of said output shaft.

2. The speed control device of claim 1, wherein said electromagnetic spring clutch includes a wrap-spring clutch.

3. The speed control device of claim 1 wherein said clutch includes:
   an input hub disposed about said output shaft and rotatable relative to said output shaft, said input hub being connected to a transfer gear that is mounted to said input shaft for rotation therewith;
   a wrap spring connected to said input hub;
   an annular control collar coupled to said wrap spring and having a collar flange portion;
   a shaft hub mounted to said output shaft for rotation therewith; and,
   a coil assembly responsive to said control signal and including an annular housing and a coil disposed within said housing, said housing having a housing flange portion;
   wherein said collar flange portion and said housing flange portion are axially adjacent.

4. The speed control device of claim 3, wherein said clutch further includes an annular flux transfer hub disposed radially inwardly of said housing and radially outwardly of said shaft hub.

5. The speed control device of claim 3 wherein a portion of said input hub is axially adjacent a portion of said shaft hub.

6. The speed control device of claim 3 wherein said control collar is disposed radially outwardly of a portion of said input hub and a portion of said shaft hub.

7. The speed control device of claim 3 wherein said collar flange portion extends in a direction perpendicular to said longitudinal axis.

8. The speed control device of claim 3 wherein said housing flange portion extends in a direction perpendicular to said longitudinal axis.

9. The speed control device of claim 3 wherein said shaft hub is unitary in construction and includes a first portion having a first diameter and a second portion having a second diameter, less than said first diameter, said first and second portions defining a shoulder therebetween.

10. The speed control device of claim 9 wherein said control collar includes a friction surface and wherein a current generated in said coil causes said friction surface to engage said shoulder.

11. A speed control device, comprising:
    a motor;
    an input shaft drivingly connected to said motor;
    an electromagnetic spring clutch having an output shaft extending along a longitudinal axis, said clutch being configured to selectively couple said input shaft with said output shaft according to a control signal;
    a spool coupled to said output shaft; and
    a cable wound about said spool, said cable connected to a throttle assembly.

12. The speed control device of claim 11, wherein said electromagnetic spring clutch includes a wrap-spring clutch.

13. The speed control device of claim 11 wherein said clutch includes:
    an input hub disposed about said output shaft and rotatable relative to said output shaft, said input hub being connected to a transfer gear that is mounted to said input shaft for rotation therewith;
    a wrap spring connected to said input hub;
    an annular control collar coupled to said wrap spring and having a collar flange portion;
    a shaft hub mounted to said output shaft for rotation therewith; and,
    a coil assembly responsive to said control signal and including an annular housing and a coil disposed within said housing, said housing having a housing flange portion;
    wherein said collar flange portion and said housing flange portion are axially adjacent.

14. The speed control device of claim 13, wherein said clutch further includes an annular flux transfer hub disposed radially inwardly of said housing and radially outwardly of said shaft hub.

15. The speed control device of claim 13 wherein a portion of said input hub is axially adjacent a portion of said shaft hub.

16. The speed control device of claim 13 wherein said control collar is disposed radially outwardly of a portion of said input hub and a portion of said shaft hub.

17. The speed control device of claim 13 wherein said collar flange portion extends in a direction perpendicular to said longitudinal axis.

18. The speed control device of claim 13 wherein said housing flange portion extends in a direction perpendicular to said longitudinal axis.

19. The speed control device of claim 13 wherein said shaft hub is unitary in construction and includes a first portion having a first diameter and a second portion having a second diameter, less than said first diameter, said first and second portions defining a shoulder therebetween.

20. The speed control device of claim 19 wherein said control collar includes a friction surface and wherein a current generated in said coil causes said friction surface to engage said shoulder.

* * * * *